No. 760,576. PATENTED MAY 24, 1904.
C. SONKE.
DEVICE FOR TURNING THE WHEELS OF BAND SAWS.
APPLICATION FILED JAN. 2, 1903.
NO MODEL.
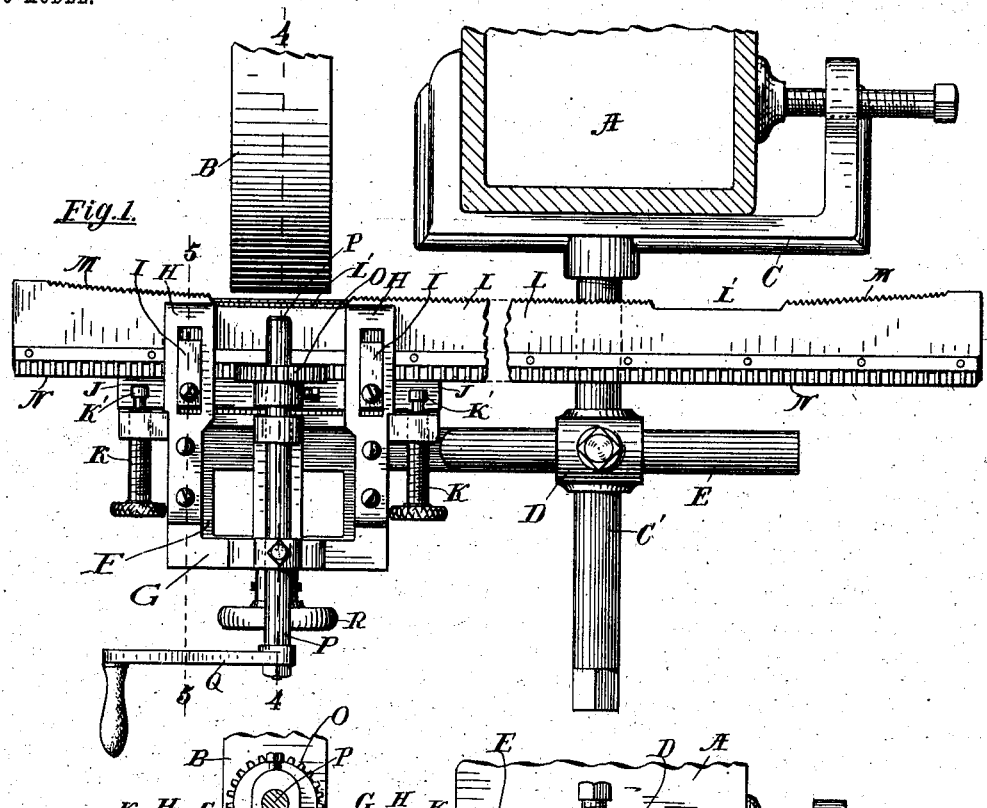
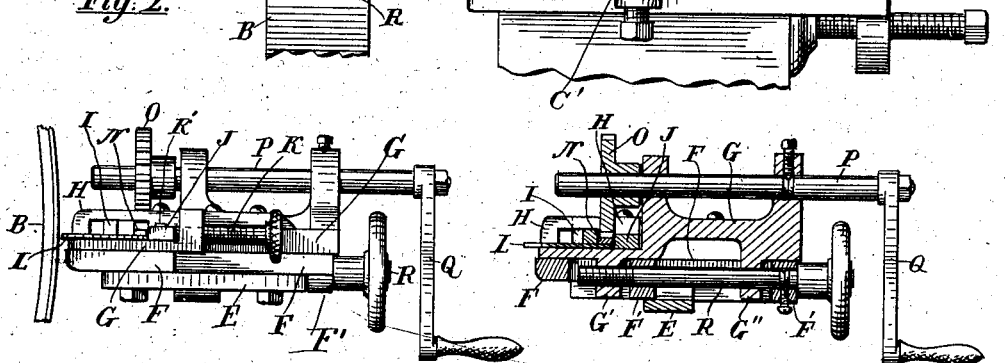
Witnesses
Georgiana Chase
Mira P. Lowes
Inventor
Christain Sonke
By
Luther V. Moulton
Attorney No. 760,576. Patented May 24, 1904.

UNITED STATES PATENT OFFICE.

CHRISTAIN SONKE, OF GRAND RAPIDS, MICHIGAN.

DEVICE FOR TURNING THE WHEELS OF BAND-SAWS.

SPECIFICATION forming part of Letters Patent No. 760,576, dated May 24, 1904.

Application filed January 2, 1903. Serial No. 137,488. (No model.)

*To all whom it may concern:*

Be it known that I, CHRISTAIN SONKE, a citizen of the United States, residing at Grand Rapids, in the county of Kent and State of Michigan, have invented certain new and useful Improvements in Devices for Turning the Wheels of Band-Saws; and I do hereby declare the following to be a full, clear, and exact description of the invention, such as will enable others skilled in the art to which it appertains to make and use the same.

My invention relates to improvements in devices for turning the wheels of band-saws in the process of construction or cleaning or returning the same after use; and its object is to provide a device that can be readily attached to the band-saw frame and brought in proper relation to operate upon the surface of the wheels that engage the saw while the same are in motion and to provide the device with certain new and useful features hereinafter more fully described, and particularly pointed out in the claims.

My device consists, essentially, of a suitable tool to engage and cut away or to clean the rim of the wheel, a clamp adapted to engage the frame of the machine, an adjustable carriage supported by the clamp, adjustable ways or guides on the carriage, a rack and pinion for moving the tool in the ways or guides, and means for operating these various parts, as hereinafter more fully described, reference being had to the accompanying drawings, in which—

Figure 1 is a plan view of a device embodying my invention; Fig. 2, a front elevation of the same; Fig. 3, an end elevation of the left-hand portion of the same; Fig. 4, a vertical section on the line 4 4 of Fig. 1, and Fig. 5 the same on the line 5 5 of Fig. 1.

Like letters refer to like parts in all of the figures.

A represents a portion of the frame of a band-saw machine; B, a portion of one of the wheels of the said machine, said wheel having a surface of leather adapted to engage and operate the band-saw; C, a suitable clamp adapted to be detachably secured to the frame A; C', a rigid arm projecting from the clamp, on which arm is an adjustable socket D to receive and adjustably hold the bar E, to which bar is attached a bed-plate F, on which plate is mounted a carriage G, adjustable toward and from the wheel B by means of a screw R, journaled in suitable bearings F' on the bed-plate and extending through and engaging the screw-threaded lug G' on the carriage. Another lug G'' on the carriage slidably engages the screw at a distance from the lug G', whereby the screw and lugs serve to both adjust and guide the carriage on the bed-plate without the use of the usual ways to guide the carriage. Longitudinally slidable on this carriage is a suitable tool L, consisting of a thin plate of steel, having the middle portion of its forward edge serrated or toothed and projecting over the edge of the carriage to engage and cut away or clean the surface of the wheel B, which surface consists usually of a layer of leather or other suitable material. The middle portion of this tool is parallel with its length or line of movement and adapted to engage the surface of the wheel parallel with its axis. The ends of this tool are wider and inclined, as at M, to bevel off the edges of the wheel, and between these portions are recesses L', which do not contact the wheel, whereby the end portions and the middle portion of the tool are independently operative at pleasure without readjusting the carriage. This tool rests upon the carriage and slides longitudinally thereon.

N is a rack-bar extending along the back of the tool and engaged by a pinion O to move the tool longitudinally on the carriage. Said pinion is mounted on a shaft P, journaled in suitable bearings on the carriage and provided with a crank Q.

To adjust the tool on the carriage, a bar J slidably engages the back of the tool and is held and adjusted by screws K, extending through suitable screw-threaded lugs on the carriage and provided with heads K', engaging suitable recesses in the bar.

To hold the tool down upon the carriage near its forward edge, clamps H are attached to the carriage and extend transversely above the tool, and thence downward and slidably engage the upper side of the same near the front of the carriage. Within suitable recesses in these clamps are adjustable blocks I, attached to the bar J, and extending above the rack-bar N, and thence downward and engaging the top and front of the bar, whereby the rear of the tool is held down upon the carriage and permitted to slide longitudinally thereon. The tool can thus by means of the screw K be adjusted to project slightly beyond the front of the carriage and readjusted as it is worn away, and by means of the screw R the carriage, together with the tool, can be moved toward the wheel B to engage and properly cut or clean the same, and by turning the crank Q the rack and pinion will move the tool longitudinally to properly operate the same, and at the same time the clamps and blocks prevent any viabration of the tool.

Having thus fully described my invention, what I claim, and desire to secure by Letters Patent, is—

1. The combination of a carriage, means for supporting the same near a band-saw wheel, a tool consisting of an elongated plate having a serrated edge to engage the wheel and slidable on the carriage, a rack on the plate, a pinion engaging the rack, and means for rotating the pinion.

2. The combination of a carriage, means for supporting and adjusting the same relative to a band-saw wheel, a tool consisting of a plate longitudinally movable on the carriage and having a serrated edge on its middle portion adapted to engage the wheel and also having inclined ends, and recesses between the ends and middle portion, and means for moving the tool longitudinally on the carriage.

3. The combination of a carriage, means for supporting and adjusting the carriage relative to a band-saw wheel, a plate slidable on the carriage and having a serrated edge to engage the wheel, a rack on the plate, clamps on the carriage and engaging the plate near the front thereof, a pinion engaging the rack, and means for rotating the pinion.

4. The combination of a carriage, means for supporting and adjusting the carriage relative to a band-saw wheel, a plate to engage the wheel and projecting over the carriage, and also slidable thereon, a rack on the plate, clamps on the carriage and engaging the plate, a bar on the carriage and engaging the back of the plate, blocks on the bar engaging the rack, and means for adjusting the bar on the carriage.

5. The combination of a carriage, means for supporting and adjusting the carriage relative to a band-saw wheel, a plate slidable on the carriage and having a serrated edge to engage the wheel, clamps on the carriage to engage the plate and provided with recesses, a rack on the plate, blocks slidable in the recesses and engaging the rack, and means for adjusting the blocks in the recesses.

6. The combination of a clamp adapted to be attached to a band-saw frame, a rigid arm on the clamp, a socket adjustable on the arm, a bar adjustable in the socket, a bed-plate attached to the bar, a carriage movably supported on the bed-plate, means for adjusting the carriage, a plate slidable on the carriage and having a serrated edge, and means for sliding the plate on the carriage.

7. The combination of a clamp adapted to be attached to a band-saw frame, a bed-plate adjustably supported by the clamp, a carriage adjustable on the bed-plate, a screw journaled on the bed-plate and engaging lugs on the carriage, a plate slidable on the carriage and having a serrated edge to engage the wheel, a rack on the plate, a shaft journaled on the carriage, a crank to turn the shaft, and a pinion on the shaft and engaging the rack.

8. The combination of a bed-plate, a clamp adapted to be attached to a band-saw frame and adjustably connected to the bed-plate, a carriage movable on the bed-plate, a screw to adjust the carriage, a plate slidable on the carriage and having a serrated edge to engage the wheel, clamps on the carriage to engage the plate, a rack on the plate, blocks engaging the rack, means for adjusting the blocks, a pinion engaging the rack, and means for rotating the pinion.

9. The combination of a bed-plate, means for adjustably supporting the same near a band-saw wheel, a carriage adjustable on the bed-plate, a plate slidable on the carriage and having a serrated edge to engage the wheel means for adjusting the carriage on the bed-plate, means for sliding the plate on the carriage, clamps on the carriage engaging the front of the plate and provided with recesses, a rack on the rear of the plate, blocks in the recesses and engaging the rack, a bar engaging the rear of the plate and attached to the blocks, screws having heads engaging recesses in the said bar, a pinion engaging the rack, and means for rotating the pinion.

10. The combination of a clamp adapted to be attached to a band-saw frame, a rigid arm on the said clamp, an adjustable socket on the arm, a bar adjustable in said socket, a bed-plate attached to the bar, a screw journaled on the bed-plate, a carriage slidable on the bed-plate and having lugs engaging the screw, a plate slidable on the carriage and having a serrated edge to engage the wheel of the band-saw, a rack on the plate, clamps on the carriage and engaging the plate, blocks engaging the rack, a bar attached to the blocks and engaging the edge of the plate, screws to adjust the said bar, a shaft journaled on the carriage, a crank on the shaft and a pinion on the shaft and engaging the rack.

In testimony whereof I affix my signature in presence of two witnesses.

CHRISTAIN SONKE.

Witnesses:
LUTHER V. MOULTON,
GEORGIANA CHACE.